(12) United States Patent
Carlson et al.

(10) Patent No.: US 7,944,812 B2
(45) Date of Patent: May 17, 2011

(54) REDUNDANT INTERMEDIARY SWITCH SOLUTION FOR DETECTING AND MANAGING FIBRE CHANNEL OVER ETHERNET FCOE SWITCH FAILURES

(75) Inventors: Scott M. Carlson, Tucson, AZ (US); Daniel G. Eisenhauer, Austin, TX (US); Roger G. Hathorn, Tucson, AZ (US); Sandy K. Kao, Austin, TX (US); Jeffrey W. Palm, Rochester, MN (US); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 12/254,222

(22) Filed: Oct. 20, 2008

(65) Prior Publication Data

US 2010/0097941 A1    Apr. 22, 2010

(51) Int. Cl.
*H04J 1/16* (2006.01)
(52) U.S. Cl. ..................... 370/217; 370/242
(58) Field of Classification Search ............ 370/216, 370/217, 218, 219, 220, 221, 227, 228, 245, 370/242, 244
See application file for complete search history.

(56) References Cited

U.S. PATENT DOCUMENTS

| | | | |
|---|---|---|---|
| 5,323,144 A | 6/1994 | Imai et al. | |
| 5,959,972 A * | 9/1999 | Hamami | 370/228 |
| 6,609,165 B1 * | 8/2003 | Frazier | 710/36 |
| 6,643,602 B2 | 11/2003 | Lay et al. | |
| 6,973,595 B2 | 12/2005 | Kaminsky et al. | |
| 7,027,450 B2 | 4/2006 | Collette et al. | |
| 7,213,178 B1 | 5/2007 | Prasad et al. | |
| 7,218,640 B2 | 5/2007 | Lebizay et al. | |
| 2002/0019958 A1 | 2/2002 | Cantwell et al. | |
| 2004/0156322 A1 | 8/2004 | Mehra | |
| 2005/0050243 A1 | 3/2005 | Clark | |
| 2006/0251067 A1 | 11/2006 | Desanti et al. | |
| 2009/0034522 A1 * | 2/2009 | Hayes et al. | 370/389 |
| 2009/0245791 A1 * | 10/2009 | Thaler et al. | 398/45 |

OTHER PUBLICATIONS

International Search report for application PCT/EP2009/063426 dated Apr. 1, 2010.
Ko et al., "A Case for Convergence Enhanced Ethernet: Requirements and Applications", IEEE International Conference on Communications, May 2008, pp. 5702-5707.

* cited by examiner

*Primary Examiner* — Huy D Vu
*Assistant Examiner* — Dady Chery
(74) *Attorney, Agent, or Firm* — Yee & Associates, P.C.; Matthew W. Baca

(57) ABSTRACT

A method for detecting a switch failure and managing switch failover in a Fiber Channel over Ethernet network. The plurality of Fiber Channel over Ethernet switches are connected to an intermediary Ethernet switch and to each other via an Ethernet connection. The intermediary Ethernet switch is different from the plurality of Fiber Channel over Ethernet switches. A plurality of end ports are also connected to the intermediary Ethernet switch. A failure is detected in a first switch in the plurality of Fiber Channel over Ethernet switches. The first switch is associated with a first end port in the plurality of end ports. A failure notification is sent to the first end port using the intermediary Ethernet switch. The failure notification might specify a second switch destination and an identification of the first switch. A fabric login is exchanged between the first end port and the second switch.

15 Claims, 4 Drawing Sheets

REDUNDANT INTERMEDIARY SWITCH SOLUTION FOR DETECTING AND MANAGING FIBRE CHANNEL OVER ETHERNET FCOE SWITCH FAILURES

BACKGROUND OF THE INVENTION

1. Field of the Invention

The present invention relates generally to a data processing system and more specifically to methods and systems for configuring a redundant switch for Fibre Channel over Ethernet switch failures.

2. Description of the Related Art

Fibre Channel (PC) is a high-speed protocol for connecting computers, devices, and storage systems. Fibre Channel based architectures offer a seamless protocol that provides a dedicated path between computers and storage systems. The American National Standard for Information (ANSI) task group created the Fibre Channel standard to define an I/O channel for interconnecting a number of devices at gigabit speeds. The idea behind Fibre Channel was to create a high throughput, low latency, reliable and scalable data transmission system. Fibre Channel technology has been favored by businesses, large and small, because this technology has several advantages. For example, Fibre Channel technology is capable of operating at speeds that Ethernet-based storage interconnect solutions were, in the past, not capable of matching. Additionally, Fibre Channel technology supports multiple topologies including dedicated point-to-point, shared loops, and scaled switched topologies to meet desired application requirements. Fibre Channel technology also offers a network that reduces the number of cables and the number of network interface cards required to connect to disparate storage and IP networks.

The Fibre Channel network, also referred to as a fabric, includes a physical layer of a plurality of interconnected devices, such as hubs, switches, directors, and translation devices, (such as host bus adapters, routers, and gateways). The translation devices are the intermediaries between Fibre Channel protocols and upper layer protocols, such as SCSI, FCP, FICON, Ethernet, ATM, and SONET. Devices at either end of the fabric store and distribute data throughout the network using firmware. Data is transported throughout the Fibre Channel network via Fibre Channel segments. The segments are channels of communication established between two or more nodes. The Fibre Channel segment is capable of transporting the data from one point to another point at a consistent high speed. A second set of redundant switches can also be integrated into the fabric in the event a failure is detected. The redundant switches work to minimize the loss of transmitted data frames and application downtime.

Fibre Channel over the Ethernet is a relatively new protocol specification, mapping Fibre Channel natively over Ethernet networks. Implementation of this protocol requires encapsulation of native Fibre Channel frames into an Ethernet frame. The extension of the Ethernet protocol also allows for utilizing the MAC address instead of the Fibre Channel address, which remains intact in the Ethernet payload. As a result the Ethernet becomes the Fibre Channel physical interface and the Fibre Channel becomes the transport protocol. Frames are routed to destination ports via the Fibre Channel over Ethernet fabric. The fabric routes the frames to an address which is embedded in the Fibre Channel frame header. Routing is performed using both a Fibre Channel address and a MAC address.

In traditional Fibre Channel networks, ports are associated with and connected to one and only one switch. If the switch a port is connected-to fails, this failure is immediately detectable by the port; however, the port no longer has access to the network. In a Fibre Channel over Ethernet network, ports may be connected to an intermediary Ethernet switch. This Ethernet switch device facilitates port accessibility to many redundant Fibre Channel aware Ethernet (FCoE) switches. However, with this configuration the port is unable to immediately detect the failure of the port's associated Fibre Channel over Ethernet switch because the port will not receive a link down event.

BRIEF SUMMARY OF THE INVENTION

A computer implemented method for managing switch failover in a Fibre Channel over Ethernet network. An Ethernet connection is established among a plurality of Fibre Channel over Ethernet (FCoE) switches in the Fibre Channel over Ethernet network. The plurality of FCoE switches are also connected to an intermediary Ethernet switch via the Ethernet connection. The intermediary Ethernet switch is different from the plurality of FCoE switches. A plurality of end ports are also connected to the intermediary Ethernet switch. Direct connection is avoided among the plurality of FCoE switches and the plurality of end ports. Port ID assignment and accessibility information is exchanged between the switches via a protocol, which can be a multicast protocol or a unicast handshake. Next, a failure is detected in a first switch in the plurality of FCoE switches. The first switch is associated with a first end port in the plurality of end ports. A failure notification is then sent by a second switch to the first end port using the intermediary Ethernet switch. The failure notification might, but need not, specify a second switch destination that identifies the second switch via the source identification in the notification as a switch available for login, and also indicates a failure at the first switch. In an illustrative embodiment, an RSCN payload could contain the port identifier of the end port being notified as the "affected port." In an illustrative embodiment, an extended link service command (ELS) notifies the end port that the end port needs to rediscover Fibre Channel over Ethernet switches and re-establish its fabric login with a different Fibre Channel over Ethernet switch that the end port can still reach. Thus, using the intermediary Ethernet switch, a fabric login exchange is facilitated between the first end port and the second switch.

DETAILED DESCRIPTION OF THE INVENTION

Figure 1:
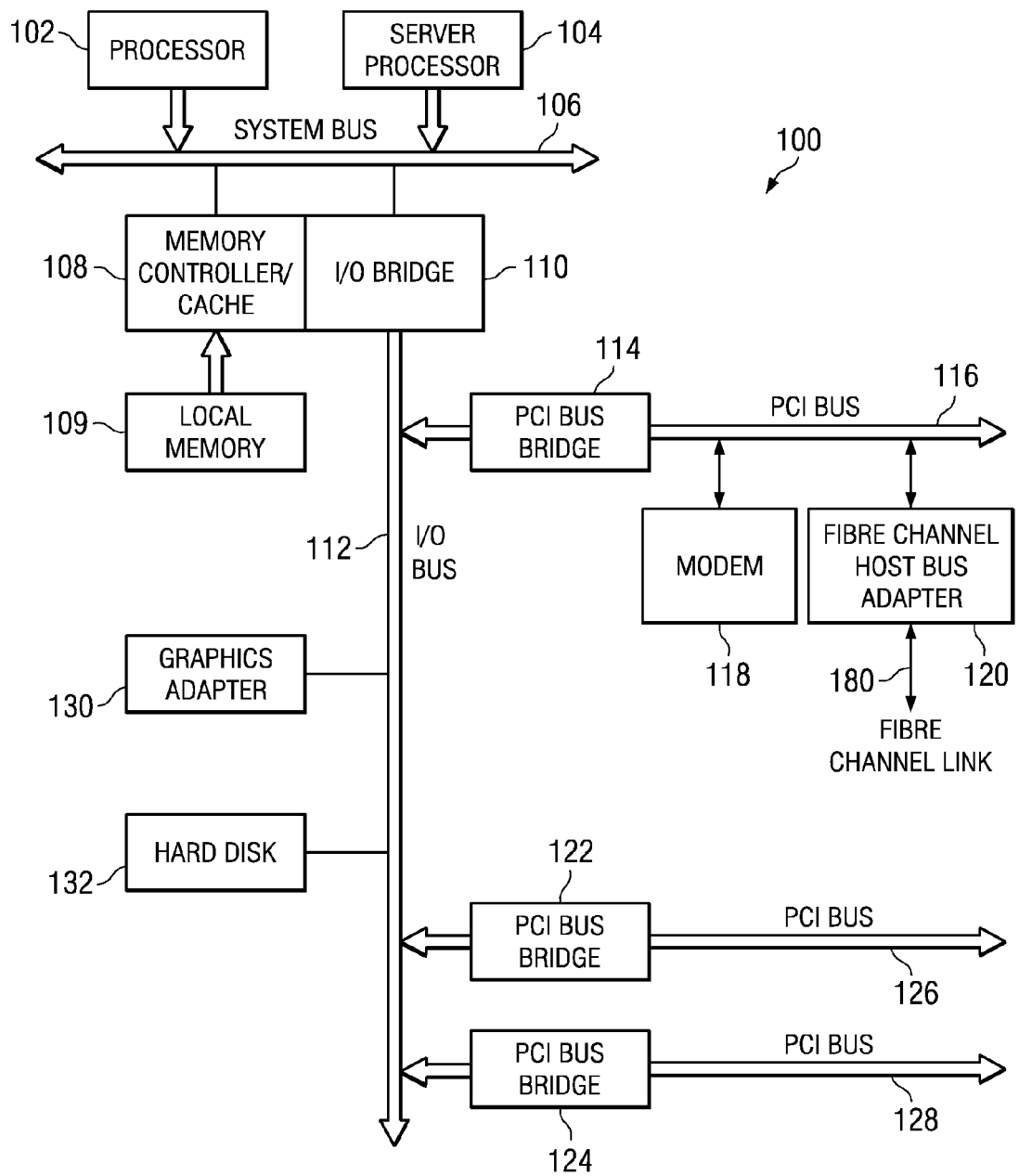
FIG. 1 is a block diagram of a prior art data processing system in which illustrative embodiments may be implemented.

As will ne appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention, it will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functional/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The illustrative embodiments provide for a switching system and a computer implemented method for managing switch failover in a Fibre Channel over Ethernet network. An Ethernet connection is established between a plurality of Fibre Channel over Ethernet (FCoE) switches in the Fibre Channel over Ethernet network. The plurality of FCoE switches are also connected to an intermediary Ethernet switch via the Ethernet connection. The intermediary Ethernet switch is different from the plurality of FCoE switches. A plurality of end ports are also connected to the intermediary Ethernet switch. Direct connection is avoided between the plurality of FCoE switches and the plurality of end ports. Port ID assignment and accessibility information is exchanged between the switches via a protocol, which can be a multicast protocol or a unicast handshake. Next, a failure is detected in a first switch in the plurality of FCoE switches. The first switch is associated with a first end port in the plurality of end ports. A failure notification is then sent by a second switch to the first end port using the intermediary Ethernet switch. The failure notification might specify a second switch destination that identifies the second switch via the source identification in the Notification as a switch available for login, and also indicates a failure at the first switch. In an illustrative embodiment, an RSCN payload could contain the port identifier of the end port being notified as the "affected port." In an illustrative embodiment, an extended link service command (ELS) notifies the end port that the end ports needs to rediscover Fibre Channel over Ethernet switches and re-establish its fabric login with a different Fibre Channel over Ethernet switch that the end port can still reach. Thus, using the intermediary Ethernet switch, a fabric login exchange is facilitated between the first end port and the second switch.

A protocol maintains port identification assignment and synchronization of accessibility information among the plurality of FCoE switches. This protocol can be a multicast protocol, a unicast protocol, or some other protocol.

When a redundant switch "B" detects, via a keep alive protocol, that a primary switch "A" has failed, the redundant switch "B" then sends a Registered State Change Notification (RSCN) or Extended Link Service (ELS) to the ports that were connected to "A" that those ports should now log on to "B". As a result, failure is both detected and compensated-for.

Figure 2:
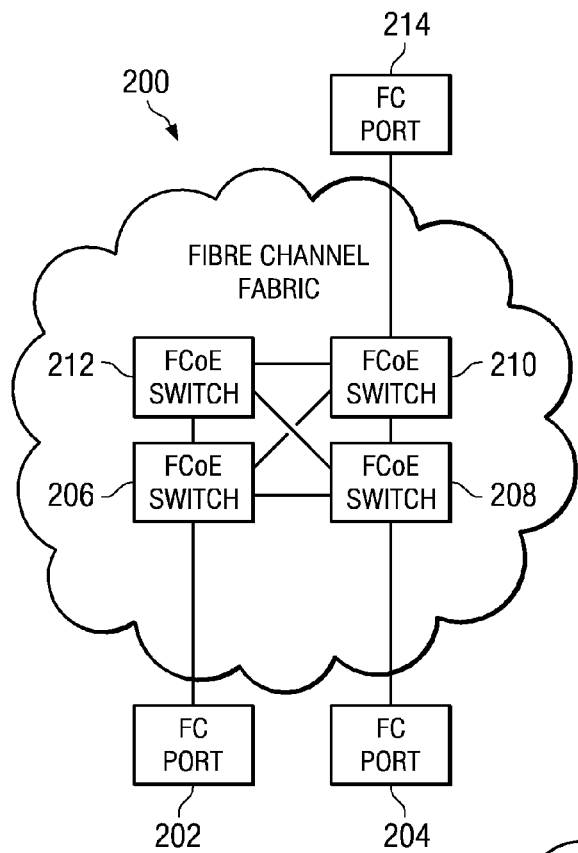
FIG. 2 is a block diagram of a prior art Fibre Channel Network in which illustrative embodiments may be implemented.
Figure 3:
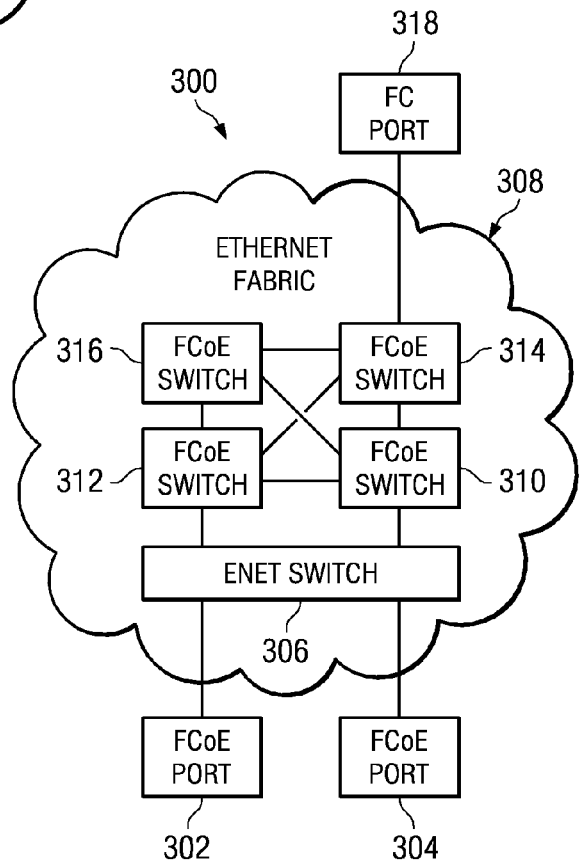
FIG. 3 is a block diagram of a Fibre Channel over Ethernet Network, in accordance with an illustrative embodiment.

With reference now to the figures, and in particular with reference to FIGS. 1-3, exemplary diagrams of data processing and network environments are provided in which illustrative embodiments may be implemented. It should be appreciated that FIGS. 1-3 are only exemplary and are not intended to assert or imply any limitation with regard to the environments in which different embodiments may be implemented. Many modifications to the depicted environments may be made.

FIG. 1 is a block diagram of a data processing system that is used to implement any of the data processing systems in accordance with the present invention. Data processing system 100 may be a symmetric multiprocessor (SMP) system including a plurality of processors 102 and 104 connected to system bus 106. Alternatively, a single processor system may be employed. In the depicted example, processor 104 is a service processor. Also connected to system bus 106 is memory controller/cache 108, which provides an interface to local memory 109. I/O bus bridge 110 is connected to system bus 106 and provides an interface to I/O bus 112. Memory controller/cache 108 and I/O bus bridge 110 may be integrated as depicted.

Peripheral component interconnect (PCI) bus bridge 114 connected to I/O bus 112 provides an interface to PCI local bus 116. A number of I/O adapters, such as modem 118 may be connected to PCI bus 116. Typical PCI bus implementations will support four PCI expansion slots or add-in connectors. Communications links to other computers may be provided through modem 118 and Fibre Channel host bus adapter 120. Host Bus Adapter (HBA) 120 enables data processing system 100 to send and receive messages from a fabric via a Fibre Channel link 180.

Additional PCI bus bridges 122 and 124 provide interfaces for additional PCI buses 126 and 128, from which additional modems or network adapters may be supported. In this manner, data processing system 100 allows connections to multiple network computers.

A memory-mapped graphics adapter 130 and hard disk 132 may also be connected to I/O bus 112 as depicted, either directly or indirectly. The illustrative embodiment of the present invention may require the generation of a simple table by a SAN administrator in order to define the authorized connections by defining authorized N-port/F-port pairs.

The illustrative embodiment of the present invention may be implemented by a FC switch operating environment, and/or storage subsystem port interface microcode, for example. The illustrative embodiments are dependent on specific hardware, software, or operating systems, but can easily be deployed in a SAN consisting of heterogeneous hosts, switches, and storage subsystems using readily available technology which implements IEEE standards. The illustrative embodiments of the present invention work within the existing IEEE Fibre Channel standards.

FIG. 2 is a block diagram of a prior art Fibre Channel Network in which illustrative embodiments may be implemented. Specifically, FIG. 2 is a block diagram of a conventional Fibre Channel fabric 200 which includes a number of Fibre Channel over Ethernet (FCoE) switches. The example of FIG. 2 shows FCoE switches 206, 208, 210, and 212, as well as Fibre Channel Ports 202, 204, and 214.

In this configuration, each Fibre Channel port is capable of being connected to one and only one switch. For example, switch 206 is connected to end port 202 and switch 208 is connected to end port 204. In this embodiment, when a failure occurs in one of the FCoE switches, the end port that is attached to the failed switch becomes inaccessible. In the depicted example, when Fibre Channel switch 208 fails, the switch failure is immediately detectable by end port 204; however, end port 204 has no other means of communication with the network.

FIG. 3 is a block diagram of a Fibre Channel over Ethernet Network, in accordance with an illustrative embodiment. Unlike in traditional Fibre Channel networks, where end ports are connected to one and only one switch, in the Fibre Channel over Ether network of FIG. 3, end ports are connected to Ethernet switch device 306, which serves as an intermediary Ethernet switch device. Thus, end ports 302 and 304 are connected to Ethernet switch device (ENET switch) 306. Ethernet switch device 306 is part of Ethernet fabric 308, which also includes FC switch 310, FC switch 312, FC switch 314, and FC switch 316, and other ports, such as FC port 318 can also be connected to Ethernet fabric 308.

Ethernet switch device 306 facilitates communication through the Ethernet ports supporting lossless Ethernet Media Access Control (MAC). This configuration provides accessibility to many redundant Fibre Channel aware Ethernet switches, such as switches 310 and 312. The end ports, 302 and 304, discover switches, such as Ethernet switch device 306. End ports 302 and 304 also initiate fabric login exchanges to instantiate a port-switch pairing. As depicted in this illustration, end port 304 is associated/paired with switch 310 and end port 302 is associated/paired with switch 312.

As indicated above, Ethernet switch device 306 also operates as an intermediary redundant switch mechanism. When a failure is detected in switch 310, end port 304 becomes inaccessible even though a physical path still exists to end port 304 through switch 312. This path is maintained by Ethernet switch device 306. In this configuration, end port 304 can now detect a failure occurring at switch 310.

When switch 310 fails, switch 312 is capable of detecting the failure. Switch 312 notifies all the ports associated with switch 310 of the failure using a failure notification. A failure notification can be implemented using an extended link service (ELS) command, by overloading an existing Registered State Change Notification (RSCN) service, or a Fibre Channel over Ethernet Initialization Protocol (FIP) frame. RSCN is a Fibre Channel service which communicates fabric changes to associated hosts. In this example, end port 304 is notified of the failure occurring in switch 310. Once end port 304 receives the notification, end port 304 re-issues a fabric login (FLOGI) to become associated with switch 312.

In essence, intermediary Ethernet switch 306 serves as an intermediary between the set of end ports and the set of FCoE switches. Thus, if a switch fails, then all other switches and all of the end ports can be notified of the failure. As a result, the overall system of switches and end ports is able to rapidly compensate for switch failures. This advantage is achieved without the use of significant additional, undesirable network traffic.

Figure 4:
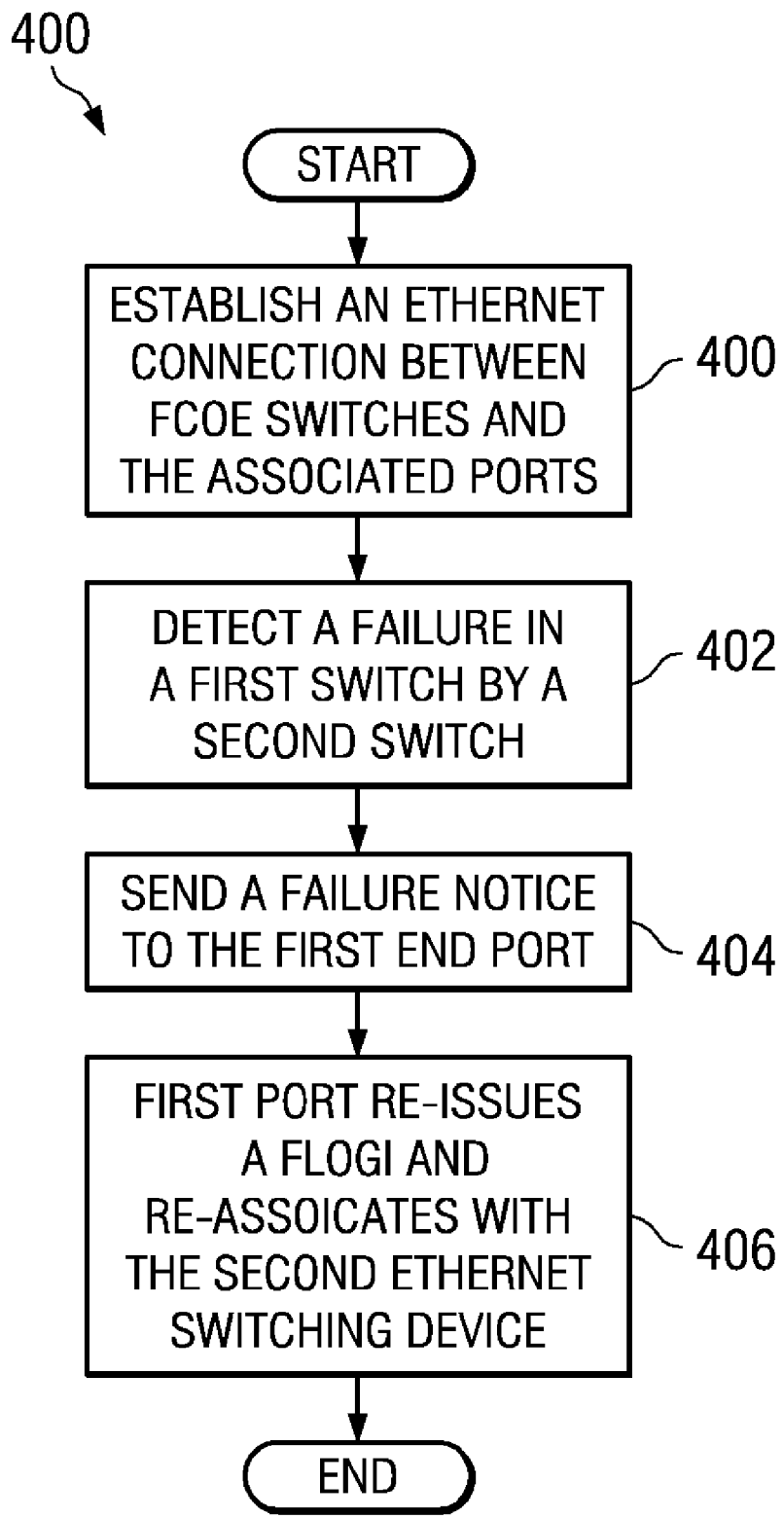
FIG. 4 is a flowchart illustrating an operation of a Fibre Channel over Ethernet switch failing over to an intermediary redundant switch, in accordance with an illustrative embodiment.

FIG. 4 is a flowchart illustrating an operation of a Fibre Channel over Ethernet switch failing over to an intermediary redundant switch, in accordance with an illustrative embodiment. The process shown in FIG. 4 can be implemented in a Fibre Channel over Ethernet configuration using an intermediary Ethernet switch, such as in the exemplary configuration shown in FIG. 3.

The process begins as an Ethernet connection is established between Fibre Channel over Ethernet (FCoE) switches and the associated ports (step 400). This connection can be accomplished, in one example, by use of an intermediary Ethernet switch, such as intermediary Ethernet switch 306 shown in FIG. 3.

Thereafter, the occurrence of a failure in a first switch is detected by a second switch (step 402). The first switch is associated with a first end port at fabric login. In an exemplary illustrative embodiment, a failure is noted as occurring when no response is received by the second switch in response to a link keep alive message request to the first switch. Failure can be detected by other methods, as well, such as by the associated port itself.

When the failure is detected, a failure notice, such as a Registered State Change Notification (RSCN) or Extended Link Service (ELS) command, is sent to the first end port using the Ethernet switching device (step 404). The failure notice might specify a second switch destination and the failing Fibre Channel over Ethernet switch. The failure notice is received by the first end port. After the failure notice is received, the Ethernet switch device receives a fabric login exchange (FLOGI) from the first end port. In an illustrative embodiment, the first port reissues a FLOGI and associates with the second Ethernet switching device (step 406). The extended link service (ELS) command usually does not indicate which switch to use. Thus, after the ELS command is received, the end port will re-perform Fibre Channel over Ethernet switch discovery, choose a new reachable Fibre Channel over Ethernet switch, and initiate a FLOGI. The process then terminates.

Figure 5:
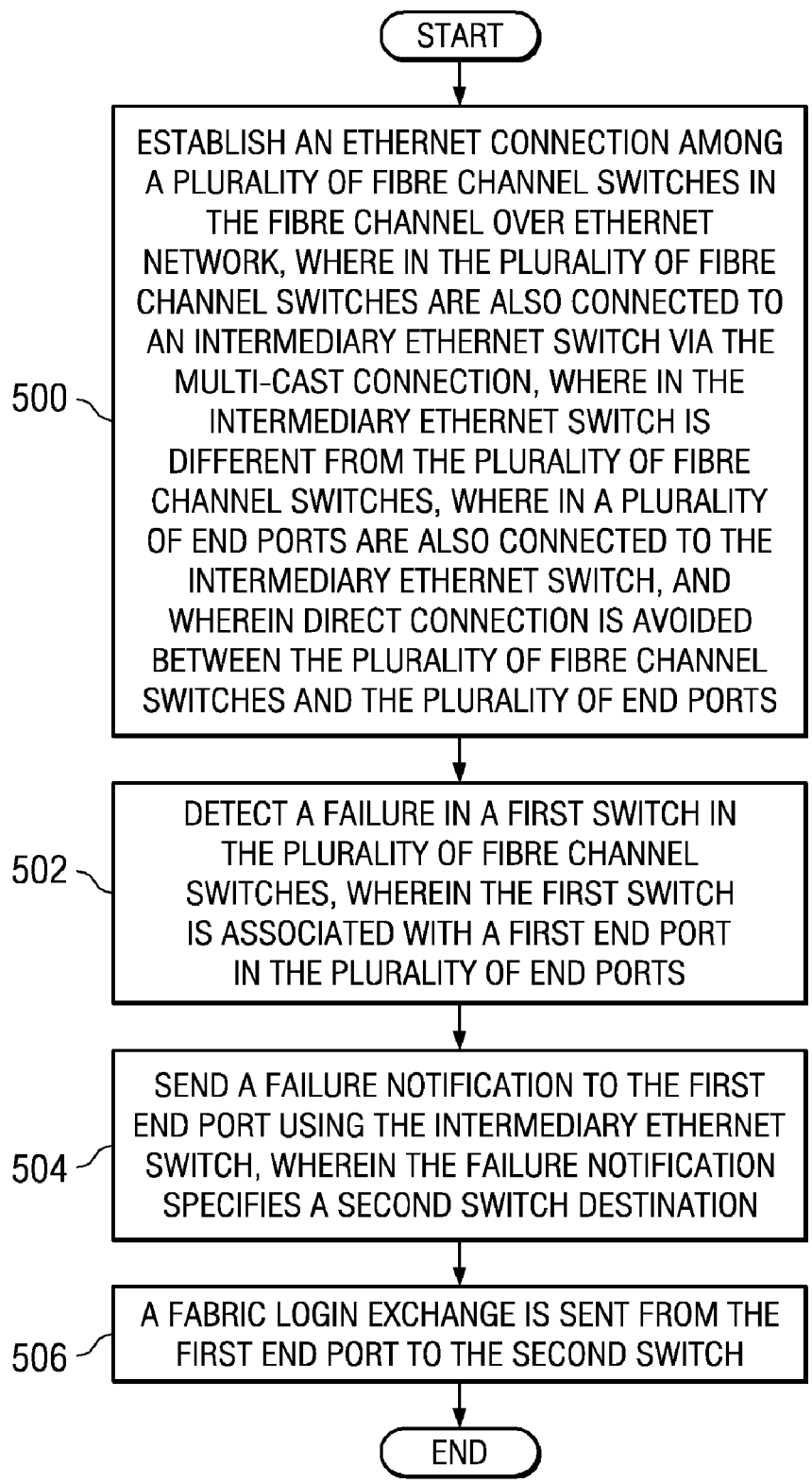
FIG. 5 is a flowchart illustrating a method for managing switch failover in a Fibre Channel over Ethernet network, in accordance with an illustrative embodiment.

FIG. 5 is a flowchart illustrating a method for managing switch failover in a Fibre Channel over Ethernet network, in accordance with an illustrative embodiment. The process shown in FIG. 5 can be implemented in a Fibre Channel over Ethernet configuration using an intermediary Ethernet switch, such as in the exemplary configuration shown in FIG. 3.

The process begins as an Ethernet connection is established among a plurality of FCoE switches in the Fibre Channel over Ethernet network, wherein the plurality of FCoE switches are also connected to an intermediary Ethernet switch via the Ethernet connection, wherein the intermediary Ethernet switch is different from the plurality of FCoE switches, wherein a plurality of end ports are also connected to the intermediary Ethernet switch, and wherein direct connection is avoided between the plurality of FCoE switches and the plurality of end ports (step 500). A failure is detected in a first switch in the plurality of FCoE switches, wherein the first switch is associated with a first end port in the plurality of end ports (step 502). Failure can be detected when the second switch does not receive a link keep alive message from the first switch, or by some other method.

A failure notification is then sent to the first end port using the intermediary Ethernet switch, wherein the failure notification might specify a second switch destination (step 504). The failure notification can be implemented using an extended link service (ELS) command, by overloading an existing Registered State Change Notification (RSCN) service or a Fibre Channel over Ethernet Initialization Protocol (FIP) frame. A fabric login exchange is then sent from the first end port to the second switch (step 506), with the process terminating thereafter.

In an illustrative embodiment, link keep alive messages are exchanged among the plurality of FCoE switches. In this case, detecting the failure includes detecting a failure to receive a link keep alive message by the second switch. Failure could be detected by the associated port itself, or by other means. In yet another illustrative embodiment, the plurality of end ports are Fibre Channel end ports.

In another illustrative embodiment, a multicast protocol is used between the plurality of FCoE switches, wherein the multicast protocol maintains port identification assignment and synchronization of accessibility information. In this case, port identification assignment and accessibility information is exchanged between the redundant switches via the multicast protocol. When a redundant switch "B" detects, via the keep alive protocol, that a primary switch "A" has failed, the redundant switch "B" then sends a failure notification (such as an Registered State Change Notification (RSCN) or Extended Link Service (ELS)) to the ports that were connected to "A" that those ports should now log on to "B." As a result, failure is both detected and compensated-for.

Another illustrative embodiment provides for a system for managing switch failures in a Fibre Channel over Ethernet network. The system includes a first switch and a second switch. The first switch and the second switch are operable to transmit Extended Link Service commands, and an Ethernet connection is established between the first switch and the second switch. An intermediary Ethernet switching device is connected in parallel to the first switch and the second switch. The system also includes a first port and a second port. The first port is linked in association with the first switch via the intermediary Ethernet switching device. The second port is linked in association with the second switch via the intermediary Ethernet switching device. The first switch and the second switch communicate with each other using link keep alive message traffic via the intermediary Ethernet switching device. Upon detecting a failure in the first switch, an extended link service command is transmitted by the second switch to the intermediary Ethernet switching device for routing to the first port. The extended link service command instructs the first port to issue a fabric login and also instructs the first port to associate with the second switch.

In another illustrative embodiment, the first port and the second port are Fibre Channel over Ethernet ports. In still another illustrative embodiment, the first switch and the second switch are Fibre Channel over Ethernet switches.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for detecting a switch failure and managing switch failover in a Fibre Channel over Ethernet network, the computer implemented method comprising:
    establishing an Ethernet connection between a plurality of Fibre Channel over Ethernet switches in the Fibre Channel over Ethernet network, wherein the plurality of Fibre Channel over Ethernet switches are also connected to an intermediary Ethernet switch via the Ethernet connection, wherein the intermediary Ethernet switch is different from the plurality of Fibre Channel over Ethernet switches, wherein a plurality of end ports are also connected to the intermediary Ethernet switch, wherein direct connection is avoided among the plurality of Fibre Channel over Ethernet switches and the plurality of end ports;
    detecting a failure in a first switch in the plurality of Fibre Channel over Ethernet switches, wherein the first switch is associated with a first end port in the plurality of end ports, wherein detecting the failure in the first switch comprises detecting, by a second switch in the plurality of Fibre Channel over Ethernet switches, the failure in the first switch;
    sending, by the second switch, a failure notification to the plurality of end ports and to the plurality of Fibre Channel over Ethernet switches other than the first switch using the intermediary Ethernet switch, wherein the failure notification at least indicates that the first end port needs to rediscover another functioning Fibre Channel switch in the plurality of Fibre Channel over Ethernet switches, and wherein the failure notification further includes an identification of the first switch; and
    exchanging a fabric login exchange between the first end port and the another functioning Fibre Channel switch.

2. The computer implemented method of claim 1, wherein the failure notification is selected from the group consisting of an extended link service (ELS) command, an overloading of an existing Registered State Change Notification (RSCN) service, and a Fibre Channel over Ethernet Initialization Protocol (FIP) frame.

3. The computer implemented method of claim 1, wherein link keep alive messages are exchanged among the plurality of Fibre Channel over Ethernet switches, and wherein detecting the failure comprises:
    detecting a failure to receive a link keep alive message at the another functioning Fibre Channel switch.

4. The computer implemented method of claim 1, wherein a multicast protocol is used among the plurality of Fibre Channel over Ethernet switches and the plurality of end ports, and wherein the multicast protocol maintains port identification assignment and synchronization of accessibility information.

5. The computer implemented method of claim 1 wherein the plurality of end ports are Fibre Channel over Ethernet end ports.

6. The computer implemented method of claim 1 wherein the failure notification specifies the other functioning Fibre Channel switch.

7. A system for managing switch failures in a Fibre Channel over Ethernet network, the system comprising:
    a first switch and a second switch, wherein the first switch and the second switch are operable to transmit Extended Link Service commands, and wherein an Ethernet connection is established between the first switch and the second switch;

an intermediary Ethernet switching device connected in parallel to the first switch and the second switch;

a first port and a second port, wherein the first port is linked in association with the first switch via the intermediary Ethernet switching device, wherein the second port is linked in association with the second switch via the intermediary Ethernet switching device, wherein the first switch and the second switch communicate with each other using link keep alive message traffic via the intermediary Ethernet switching device, and wherein, upon detecting a failure in the first switch by the second switch, an extended link service command is transmitted by the second switch to the intermediary Ethernet switching device for routing to the first port, the extended link service command instructing the first port to issue a fabric login to associate with the second switch, and wherein a failure notification is sent to the first port and the second port.

8. The system of claim 7 wherein the first port and the second port are Fibre Channel over Ethernet ports.

9. The system of claim 7 wherein the first switch and the second switch are Fibre Channel over Ethernet switches.

10. A tangible non-transitory computer readable medium storing a computer program product which, when executed by a processor, carries out a computer implemented method for detecting a switch failure and managing switch failover in a Fibre Channel over Ethernet network, the computer implemented method comprising:

establishing an Ethernet connection between a plurality of Fibre Channel over Ethernet switches in the Fibre Channel over Ethernet network, wherein the plurality of Fibre Channel over Ethernet switches are also connected to an intermediary Ethernet switch via the Ethernet connection, wherein the intermediary Ethernet switch is different from the plurality of Fibre Channel over Ethernet switches, wherein a plurality of end ports are also connected to the intermediary Ethernet switch, wherein direct connection is avoided among the plurality of Fibre Channel over Ethernet switches and the plurality of end ports;

detecting a failure in a first switch in the plurality of Fibre Channel over Ethernet switches, wherein the first switch is associated with a first end port in the plurality of end ports, wherein detecting the failure in the first switch comprises detecting, by a second switch in the plurality of Fibre Channel over Ethernet switches, the failure in the first switch;

sending, by the second switch, a failure notification to the plurality of end ports and to the plurality of Fibre Channel over Ethernet switches other than the first switch using the intermediary Ethernet switch, wherein the failure notification at least indicates that the first end port needs to rediscover another functioning Fibre Channel switch in the plurality of Fibre Channel over Ethernet switches, and wherein the failure notification further includes an identification of the first switch; and exchanging a fabric login exchange between the first end port and the another functioning Fibre Channel switch.

11. The tangible computer readable medium of claim 10, wherein the failure notification is selected from the group consisting of an extended link service (ELS) command, an overloading of an existing Registered State Change Notification (RSCN) service, and a Fibre Channel over Ethernet Initialization Protocol (FIP) frame.

12. The tangible computer readable medium of claim 10, wherein link keep alive messages are exchanged among the plurality of Fibre Channel over Ethernet switches, and wherein detecting the failure comprises:

detecting a failure to receive a link keep alive message at the another functioning Fibre Channel switch.

13. The tangible computer readable medium of claim 10, wherein a multicast protocol is used among the plurality of Fibre Channel over Ethernet switches and the plurality of end ports, and wherein the multicast protocol maintains port identification assignment and synchronization of accessibility information.

14. The tangible computer readable medium of claim 10 wherein the plurality of end ports are Fibre Channel over Ethernet end ports.

15. The tangible computer readable medium of claim 10 wherein the failure notification specifies the other functioning Fibre Channel switch.

* * * * *